United States Patent
Yau et al.

(10) Patent No.: US 6,221,546 B1
(45) Date of Patent: Apr. 24, 2001

(54) PROTECTING LAYER FOR IMAGE RECORDING MATERIALS

(75) Inventors: Hwei-Ling Yau, Rochester; Kevin M. O'connor, Webster; Tienteh M. Chen, Penfield; David E. Decker, Rochester, all of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/354,209

(22) Filed: Jul. 15, 1999

(51) Int. Cl.$^7$ .............................. G03C 11/08; G03C 1/76; G03C 1/85; B41J 2/01
(52) U.S. Cl. ......................... 430/14; 430/432; 430/527; 430/536; 430/961; 347/105
(58) Field of Search .................. 430/536, 961, 430/14, 432, 527; 347/105

(56) References Cited

U.S. PATENT DOCUMENTS

| | | | |
|---|---|---|---|
| 2,173,480 | 9/1939 | Jung . | |
| 2,719,791 | 10/1955 | Land . | |
| 2,751,315 | 6/1956 | Staehle . | |
| 2,956,877 | 10/1960 | Land et al. . | |
| 4,092,173 | 5/1978 | Novak et al. . | |
| 4,171,979 | 10/1979 | Novak et al. . | |
| 4,279,945 | 7/1981 | Audran et al. | 430/140 |
| 4,302,523 | 11/1981 | Audran et al. | 430/140 |
| 4,333,998 | 6/1982 | Leszyk | 430/12 |
| 4,426,431 | 1/1984 | Harasta et al. | 430/14 |
| 4,459,601 | 7/1984 | Howkins | 346/140 R |
| 4,490,728 | 12/1984 | Vaught et al. | 346/1.1 |
| 4,507,385 * | 3/1985 | Steklenski et al. | 430/536 |
| 4,723,129 | 2/1988 | Endo et al. | 346/1.1 |
| 4,954,395 | 9/1990 | Hasegawa et al. | 346/135.1 |
| 5,376,434 | 12/1994 | Ogawa et al. | 430/627 |
| 5,447,832 | 9/1995 | Wang et al. | 430/523 |
| 5,560,770 | 10/1996 | Yatake | 106/22 R |
| 5,563,634 | 10/1996 | Fujii et al. | 347/9 |
| 5,571,850 | 11/1996 | Ma et al. | 106/23 C |
| 5,605,750 | 2/1997 | Romano et al. | 428/195 |
| 5,738,716 | 4/1998 | Santilli et al. | 106/413 |
| 5,853,965 | 12/1998 | Haydock et al. | 430/536 |
| 5,866,282 | 2/1999 | Bourdelais et al. | 430/536 |
| 5,874,205 | 2/1999 | Bourdelais et al. | 430/536 |
| 5,875,370 | 2/1999 | Patton et al. | 396/606 |
| 5,888,643 | 3/1999 | Aylward et al. | 430/536 |
| 5,888,681 | 3/1999 | Gula et al. | 430/536 |
| 5,888,683 | 3/1999 | Gula et al. | 430/536 |
| 5,888,714 | 3/1999 | Bourdelais et al. | 430/536 |
| 5,905,924 | 5/1999 | Patton et al. | 396/614 |
| 5,952,130 * | 9/1999 | Yau et al. | 430/536 |

FOREIGN PATENT DOCUMENTS

| | | |
|---|---|---|
| 0206295 | 12/1986 | (EP) . |
| 0302938 | 2/1989 | (EP) . |
| 0915372 | 5/1999 | (EP) . |
| 0981071 | 2/2000 | (EP) . |
| 61 221253 | 10/1986 | (JP) . |

OTHER PUBLICATIONS

H. P. Le, Progress and Trends I nInk–Jet Printing Technology.

John L. Gardon, Emulsion Polymerization, 1977, pp. 143–197.

W.E. Lee and E.R. Brown, The Developing Agents And Their Reactions, The Theory Of Photographic Process, 1977, pp. 291–327.

Research Disclosure No. 37038, Feb. 1995, Typical And Preferred Colored Paper, Color Negative, And Color Reversal Photographic Elements And Processing.

Research Disclosure No. 34390, Nov. 1992, Photographic Light–Sensitive Silver Halide Film Can Comprise A Transparent Magnetic Recording Layer, Usually Provided On The Backside Of The Photographic Support.

\* cited by examiner

*Primary Examiner*—Richard L. Schilling
(74) *Attorney, Agent, or Firm*—Doreen M. Wells

(57) ABSTRACT

The present invention is a coating composition comprising a water insoluble polymer having a Tg less than 25° C. and comprising 75 to 100 weight percent of the monomer having the following formula:

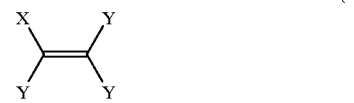

(1)

wherein: X is selected from the group consisting of —Cl, —F, or —CN, and Y is each independently selected from the group consisting of H, Cl, F, CN, $CF_3$, $CH_3$, $C_2H_5$, n—$C_3H_7$, iso—$C_3H_7$, n—$C_4H_9$, n—$CH_{11}$, n—$C_6H_{,13}$, $OCH_3$, $OC_2H_5$, phenyl, $C_6F_5$, $C_6Cl_5$, $CH_2Cl$, $CH_2F$, Cl, F, CN, $CF_3$, $C_2F_5$, n—$C_3F_7$, iso— $C_3F_7$, $OCF_3$, $OC_2F_5$, $OC_3F_7$, $C(CF_3)_3$, $CH_2(CF_3)$, $CH(CF_3)_2$, —$COCF_3$, $COC_2F_5$, $COCH_3$, $COC_2H_5$.

18 Claims, No Drawings

PROTECTING LAYER FOR IMAGE RECORDING MATERIALS

CROSS REFERENCE TO RELATED APPLICATIONS

The present invention is related to commonly owned U.S. applications filed on even date herewith: U.S. Ser. No. 09/354,055 of Yau et al., titled OVERCOAT MATERIAL AS PROTECTING LAYER FOR IMAGE RECORDING MATERIALS, U.S. Ser. No. 09/354,939 of Yau et al., titled WATER-RESISTANT PROTECTIVE OVERCOAT FOR AgX PHOTOGRAPHIC SYSTEMS and U.S. Ser. No. 09,354,556 of Yau et al., titled PROTECTING LAYER FOR GELATIN BASED PHOTOGRAPHIC PRODUCTS CONTAINING 1H-PYRAZOLO[1,5-b][1,2,4]TRIAZOLE-TYPE MAGENTA COUPLER.

FIELD OF THE INVENTION

The present invention relates to image recording materials. More particularly the present invention discloses a protective overcoat, which provides excellent scratch and fingerprint resistance, water resistance and gloss to image recording materials.

BACKGROUND OF THE INVENTION

Gelatin or other hydrophilic polymers are commonly used as binders in image recording materials such as silver-based photographic materials and ink-jet receivers. These products are known to be very swellable when in contact with water. The swelling property is essential in order to accomplish photographic processing chemistry or to absorb ink to generate images. However, the same property also inhibits end users from fully enjoying the product, such as handling without worry about spilling drinks or leaving fingerprints, or having to keep negatives or prints in envelopes or storage sleeves in order to avoid scratches.

The concept of applying a colloidal suspension to moist film or print material at the end of photographic processing has been disclosed in U.S. Pat. No. 2,173,480 (1939). However, since the best way to use this technology is to implement it in currently existing photofinishing equipment and laboratories, useful inventions must focus on material compositions that will best fit in with current photofinishing systems. Teachings on various methods and apparatus for applying a controlled amount of material on the silver-based photographic materials during photographic processing have been filed: U.S. Ser. No. 08/965,560 (filed Nov. 6, 1997), U.S. Pat. No. 5,905,924 and U.S. Pat. No. 5,875,370.

The temperature and residence time of photographic materials in the drying section of photofinishing trade equipment vary from 50° C. to 70° C. and from 30 seconds to 2.5 minutes. The actual temperature of gelatin coating during drying is much lower than the temperature set for the dryer due to the evaporation of water. In addition, it is necessary to be free of volatile organic compound (VOC) in the formulation in order to be user and environment friendly. Under these stringent requirements, it appears that an aqueous colloidal dispersion of water insoluble polymeric materials is the only appropriate system for this technology. Water soluble materials will not provide any water resistance property.

U.S. Pat. No. 2,719,791 describes the use of an aqueous dispersion of organic plastic material, which yields a water impermeable coating on drying. However, it is known that when dispersions of low Tg material (Tg<25° C.) are used to obtain a water resistant protective coating, the surface of the protective coating has an undesirable tacky characteristic, which generally degrades other physical properties in customers hands, such as print blocking, fingerprinting, dust attraction and high scratch propensity. When dispersions of high Tg materials (Tg>25° C.) are used, it is not possible to form a continuous water resistance layer on the prints under the drying condition described above. U.S. Pat. No. 2,751,315 also describes the use of aqueous dispersion of copolymer materials. It was recognized in the patent that the low Tg materials were not quite suitable and therefore higher Tg polymer in combination with a high-boiling-point organic cosolvent was used in order to form a water resistant protective coating. However, the organic solvent that is released from the formulation during drying creates an environmental concern if used in the current photofinishing laboratories with high throughput. U.S. Pat No. 2,956,877 describes the method of applying a solution that would solubilize the processing reagents from the photographic materials as well as forming a protective coating on its surface. The disadvantage of this approach is that not only can the acid groups on the polymer degrade the water resistant property of the final protective layer, but also the organic solvent required in the formulation is, again, not suitable for high volume photofinishing laboratories.

A series of patents describes the application of UV-polymerizable monomers and oligomers on imaged photographic materials followed by UV exposure to cure the formulation in order to obtain a crosslinked durable protective layer, e.g. U.S. Pat. Nos. 4,092,173, 4,171,979, 4,333, 998 and 4,426,431. The major concern for this type of technology is that the use of highly toxic multi-functional monomer compounds in the formulation prevents it from being environmentally and user friendly, and the relatively short shelf life of the coating solutions.

U.S. Pat. No. 5,376,434 describes the use of at least two resins in the protective overcoat layer of a photographic print, at least one first resin having a glass transition temperature (Tg) of not less than 80° C., and at least one second resin having a Tg of 0° C. to 30° C., wherein an arithmetic mean of the glass transition temperatures of said first resin and said second resin is 30° C. to 70° C. The patent teaches the use of the high Tg resin to reduce the stickiness of the overcoat due to the low Tg material.

U.S. Pat. No. Patent 5,447,832 describes coating compositions for imaging elements comprising aqueous-based mixtures of lower Tg, film-forming polymeric particles and higher-Tg, non-film-forming polymeric particles. The film-forming particles provide continuous film formation and the non-film-forming particles comprising glassy polymers provide resistance to tackiness, blocking, ferrotyping, abrasion and scratching.

While recognizing the above-mentioned benefits of two-component aqueous dispersions cited in U.S. Pat. Nos. 5,376,434 and 5,447,832, U.S. Ser. No. 09/136,375 (filed Aug. 19, 1998; now U.S. Pat. No. 5,952,130) further disclosed preferred substituents on the high and low Tg components in two-latex formulations in order to obtain improved fingerprint resistance. Most preferred monomers are acrylonitrile, methacrylonitrile, vinylidene chloride and vinylidene fluoride. U.S. Ser. No. 09/136,375, now U.S. Pat. No. 5,952,130, further describes the use of a combination of at least two aqueous colloidal dispersions of water insoluble polymeric materials for protective overcoat of silver halide photographic prints, at least one has Tg less than 25° C. and at least one has Tg equal to or greater than 25° C. The low Tg material comprises 20% to 95% by weight of the total material laydown, and the high Tg material comprises 5% to 80% by weight of the total material laydown. Furthermore, to provide fingerpnt resistance, at least one of the materials used in the combination, regardless of its Tg, contains one or more comonomers of that invention (see formula (1) below) at 20% to 100% by weight based on the total monomers,

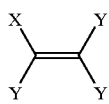

(1)

wherein: X is selected from the group consisting of Cl, F or CN, and Y is each independently selected from the group consisting of H, Cl, F, CN, $CF_3$, $CH_3$, $C_2H_5$, n—$C_3H_7$, iso—$C_3H_7$, n—$C_4H_9$, n—$C_5H_{11}$, n—$C_6H_{13}$, $OCH_3$, $OC_2H_5$, phenyl, $C_6F_5$, $C_6Cl_5$, $CH_2Cl$, $CH_2F$, $C_2F_5$, n—$C_3F_7$, iso—$C_3F_7$, $OCF_3$, $OC_2F_5$, $OC_3F_7$, $C(CF_3)_3$, $CH_2(CF_3)$, $CH(CF_3)_2$, $COCF_3$, $COC_2F_5$, $COCH_3$, $COC_2H_5$.

The preferred monomers of formula (1) of this invention are acrylonitrile, methacrylonitrile, vinylidene chloride, vinylidene fluoride, vinylidene cyanide, vinyl chloride, vinyl fluoride, tetrafluoroethylene, hexafluoropropylene, perfluoropropyl vinyl ether, substituted acrylonitriles including 2-ethylacrylonitfile, 2-n-propylacrylonitrile, 2-isopropylacrylonitrile, 2-n-butylacrylonitrile, 2-n-hexylacrylonitrile, 2-trifluoromethylacrylonitrile, 2-cyanoacrylonitrile, 2-chloroacrylonitrile, 2-bromoacrylonitrile,2-ethoxyacrylonitrile, cis-3-methoxyacrylonitrile, cis-3-ethoxyacrylonitrile 2-acetoxyacrylonitrile, fumaronitrile, maleonitrile. Most preferred monomers are acrylonitrile, vinylidene chloride, and methacrylonitrile.

The use of high Tg material, however, requires additional mixing during manufacturing of the formulation and tends to reduce the gloss of the image recording materials, and thus is undesirable. Therefore, there is need for novel classes of polymeric materials to protect silver-based photographic materials and ink-jet receiver materials, which do not need the combination of high and low Tg latices to fulfill the requirements of water resistance, fingerprint resistance, durability and high gloss while also providing resistance to blocking, tackiness and ferrotyping.

SUMMARY OF THE INVENTION

In the present invention, a class of low Tg polymer latices is identified which fulfills the requirements of film formation, high gloss, excellent dry and wet scratch resistance, water, oil and fingerprint resistance and low tackiness without the use of a high Tg polymer latex. The polymer latex of this invention consists 75% to 100%, preferably 80% to 95%, of the ethylenically unsaturated monomers defined in Formula (1). The Tg of the polymer is equal to or less than 30° C.

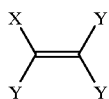

(1)

wherein: X is selected from the group consisting of Cl, F or CN, and Y is each independently selected from the group consisting of H, Cl, F, CN, $CF_3$, $CH_3$, $C_2H_5$, n—$C_3H_7$, iso—$C_3H_7$, n—$C_4H_9$, n—$C_5H_{11}$, n—$C_6H_{13}$, $OCH_3$, $OC_2H_5$, phenyl, $C_6F_5$, $C_6Cl_5$, $CH_2Cl$, $CH_2F$, $C_2F_5$, n—$C_3F_7$, iso—$C_3F_7$, $OCF_3$, $OC_2F_5$, $OC_3F_7$, $C(CF_3)_3$, $CH_2(CF_3)$, $CH(CF_3)_2$, $COCF_3$, $COC_2F_5$, $COCH_3$, $COC_2H_5$.

The preferred monomers of formula (1) of this invention are acrylonitrile, methacrylonitrile, vinylidene chloride, vinylidene fluoride, vinylidene cyanide, vinyl chloride, vinyl fluoride, tetrafluoroethylene, hexafluoropropylene, perfluoropropyl vinyl ether, substituted acrylonitriles including 2-ethylacrylonitrile, 2-n-propylacrylonitrile, 2-isopropylacrylonitrile, 2-n-butylacrylonitrile, 2-n-hexylacrylonitrile, 2-trifluoromethylacrylonitrile, 2-cyanoacrylonitrile, 2-chloroacrylonitrile, 2-bromoacrylonitrile,2-ethoxyacrylonitrile, cis-3-methoxyacrylonitrile, cis-3-ethoxyacrylonitrile 2-acetoxyacrylonitrile, fumaronitrile, maleonitrile. Most preferred monomers vinylidene chloride, vinyl chloride, acrylonitrile, methacrylonitrile, and vinylidene fluoride.

A feature of this invention is its ability to form a coating film at modest drying temperatures without being tacky on handling. The material composition described herein is a colloidal dispersion of water insoluble polymeric materials having a glass transition temperature equal to or less than 30° C.

The present invention offers, from a single-component, non-cross-linked system, a unique combination of resistance to oil and water-based spills, resistance to fingerprints, resistance to high temperature and high humidity blocking, and wipeable photographic, ink-jet and other image recording materials.

DETAILED DESCRIPTION OF THE PREFERRED EMBODIMENTS

The present invention describes a material formulation free of volatile organic compounds or solvents that is applied to an image-recording product after image formation to form a water resistant, scratch resistant, and fingerprint resistant durable overcoat. More importantly, the difference between this invention and U.S. Pat. Nos. 5,376,434 and 5,477,832 is the elimination of the use of high Tg particles in the formula without having the tackiness concern in handling the image recording materials. The material composition described in the present invention is a colloidal dispersion of water insoluble polymeric materials having glass transition temperature lower than 30° C. The polymer of this invention consists of 75% to 100%, and more preferably 80% to 95%, of the ethylenically unsaturated monomers defined in Formula (1).

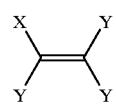

(1)

wherein: X is selected from the group consisting of Cl, F or CN, and Y is each independently selected from the group consisting of H, Cl, F, CN, $CF_3$, $CH_3$, $C_2H_5$, n—$C_3H_7$, iso—$C_3H_7$, n—$C_4H_9$, n—$C_5H_{11}$, n—$C_6H_{13}$, $OCH_3$, $OC_2H_5$, phenyl, $C_6F_5$, $C_6Cl_5$, $CH_2Cl$, $CH_2F$, $C_2F_5$, n—$C_3F_7$, iso—$C_3F_7$, $OCF_3$, $OC_2F_5$, $OC_3F_7$, $C(CF_3)_3$, $CH_2(CF_3)$, $CH(CF_3)_2$, $COCF_3$, $COC_2F_5$, $COCH_3$, $COC_2H_5$.

The preferred monomers of formula (1) of this invention are acrylonitrile, methacrylonitrile, vinylidene chloride, vinylidene fluoride, vinylidene cyanide, vinyl chloride, vinyl fluoride, tetrafluoroethylene, hexafluoropropylene, perfluoropropyl vinyl ether, substituted acrylonitriles including 2-ethylacrylonitrile, 2-n-propylacrylonitrile, 2-isopropylacrylonitrile, 2-n-butylacrylonitrile, 2-n-hexylacrylonitrile, 2-trifluoromethylacrylonitrile, 2-cyanoacrylonitrile, 2-chloroacrylonitrile, 2-bromoacrylonitrile,2-ethoxyacrylonitrile, cis-3-methoxyacrylonitrile, cis-3-ethoxyacrylonitrile 2-acetoxyacrylonitrile, fumaronitrile, maleonitrile. Most preferred monomers vinylidene chloride, vinyl chloride, acrylonitrile, methacrylonitrile, and vinylidene fluoride.

The monomers defined in Formula (1) can be copolymerized with other monomers in order to adjust their physical properties, such as particle size, latex stability, Tg, water resistance, dry and wet scratch resistance, and fingerprint resistance. Examples of ethylenically unsaturated monomers which can be copolymerized with monomers defined in formula (1) include carboxylic acids, for example, acrylic acid, alpha-chloroacrylic acid, alpha-alkylacrylic acids (such as methacrylic acid, etc.), ethylenic unsaturated salts of sulfonate or sulfate (such as sodium acrylamide-2-methylpropane-sulfonate, sodium vinylbenzenesulfonate, potassium vinylbenzylsulfonate, sodium vinylsulfonate), esters or amides derived from acrylic and methacrylic acid (for example, acrylamide, methacrylamide, n-butylacrylamide, t-butylacrylamide, diacetone acrylamide, methyl acrylate, ethyl acrylate, n-propyl acrylate, n-butyl acrylate, tert-butyl acrylate, iso-butyl acrylate, 2-ethylhexyl acrylate, n-octyl acrylate, lauryl acrylate, methyl methacrylate, ethyl methacrylate, n-butyl methacrylate, beta-hydroxy methacrylate, etc.), hydroxyalky esters or amides derived from acrylic and methacrylic acid (for example, 2-hydroxyethylacrylate, 2-hydroxyethylmethacrylate, 2-hydroxypropylacrylate, 2-hydroxypropylmethacrylate, 4-hydroxybutyl methacrylate, 4-hydroxyphenyl methacrylate, 3-hydroxypropyl methacrylate, 2-(caprolactone)ethyl methacrylate, polyethyleneglycol methacrylate, vinyl esters (for example, vinyl acetate, vinyl propionate, vinyl laurate, etc.), acrylonitrile, methacrylonitrile, aromatic vinyl compounds (for example, styrene and derivatives thereof (for example, vinyl toluene, divinyl benzene, vinyl acetophenone, sulfostyrene, etc.), itaconic acid, citraconic acid, crotonic acid, vinylidene chloride, vinyl alkyl ethers (for example, vinyl ethyl ether, etc.), esters of maleic acid, N-vinyl-2-pyrrolidone, N-vinylpyridine, 2- or 4-vinylpyridine, and difinctional crosslinking monomers (for example, divinyl benzene, ethyleneglycol dimethacrylate, ethyleneglycol diacrylate, diethyleneglycol diacrylate, diethyleneglycol dimethacrylate, triethyleneglycol diacrylate, triethyleneglycol dimethacrylate, tetraethyleneglycol diacrylate, tetraethyleneglycol dimethacrylate, 1,4-butanediol diacrylate, 1,6-hexanediol diacrylate, 1,9-nonanediol diacrylate, neopentyl glycol diacrylate, tripropylene glycol diacrylate, 1-acryloxy-3-methacryloxy glycerol, trimethylolpropane triacrylate, pentaerythritol triacrylate, glycerol propoxy triacrylate, pentaerythritol tetraacrylate) etc. Of these monomers, esters of acrylic acid, esters of methacrylic acid, and esters of maleic acid are particularly preferred.

Two or more ethylenically unsaturated monomers can be used together. For example, a combination of methyl acrylate and butyl acrylate, ethyl acrylate and itaconic acid, hydroxyethylacrylate and ethylacrylate, methyl acrylate and ethyl acrylate, etc., can be used.

The polymer of this invention can be prepared by emulsion polymerization or solution polymerization technique. Emulsion polymerization is preferred. Emulsion polymerization is well known in the art and is described, for example, in J. L. Gardon, "Emulsion Polymerization", Chapter 6 in "Polymerization Processes" edited by C. E. Schildknecht and I. Skeist, published by Wiley and Sons, Inc. New York, 1977. Examples of the chemical initiators which may be used include a thermally decomposable initiator, for example, a persulfate (such as ammonium persulfate, potassium persulfate, sodium persulfate), hydrogen peroxide, 4,4'-azobis(4-cyanovaleric acid), and redox initiators such as hydrogen peroxide-iron(II) salt, potassium persulfate-sodium hydrogensulfate, potassium persulfate-sodium metabisulfite, potassium persulfate-sodium hydrogen bisulfite, cerium salt-alcohol, etc. Emulsifiers which may be used in the emulsion polymerization include soap, a sulfonate (for example, sodium N-methyl-N-oleoyltaurate, sodium dodecylbenzene sulfonate alpha-olefin sulfonate, diphenyloxide disulfonate, naphthalene sulfonate, sulfosuccinates and sulfosuccinamates, polyether sulfonate, alkyl polyether sulfonate, alkylarylpolyether sulfonate, etc.), a sulfate (for example, sodium dodecyl sulfate), a phosphate (for example, nonylphenol ethoxylate phosphate, linear alcohol alkoxylate phosphate, alkylphenol ethoxylate phosphate, phenol ethoxylate), a cationic compound (for example, cetyl trimethylammonium bromide, hexadecyl trimethylammonium bromide, etc.), an amphoteric compound and a high molecular weight protective colloid (for example, polyvinyl alcohol, polyacrylic acid, gelatin, etc.). Specific examples and functions of the emulsifiers are described in J. L. Gardon, "Emulsion Polymerization", Chapter 6 in "Polymerization Processes" edited by C. E. Schildknecht and I. Skeist, published by Wiley and Sons, Inc., New York, 1977 and references contained therein.

The average particle size of the latex dispersion can be from 20 nm to 250 nm. The dry laydown of the total materials on the surface of the photographic product can be from 30 mg/sq.ft. to 600 mg/sq.ft. Other components commonly used in image recording materials or photographic processing solutions, such as biocides, spreading aids (surfactants), lubricants and waxes can also be incorporated in the formulation as needed. The concentration of the formulation can be from 1% solids to 70% solids depending on the thickness of the protective layer one wishes to apply, the machine speed, the dryer efficiency and other factors that may affect the solution uptake by the image recording materials.

Imaged photographic elements are among the image recording materials protected in accordance with this invention. Typically, the exemplified elements are derived from silver halide photographic elements that can be black and white elements (for example, those which yield a silver image or those which yield a neutral tone image from a mixture of dye forming couplers), single color elements or multicolor elements. Multicolor elements typically contain dye image-forming units sensitive to each of the three primary regions of the spectrum. The imaged elements can be imaged elements which are viewed by transmission, such a negative film images, reversal film images and motion picture prints or they can be imaged elements that are viewed by reflection, such as paper prints. Because of the amount of handling that can occur with paper prints and motion picture prints, they are preferred imaged elements for use in this invention.

The photographic elements in which the images to be protected are formed can have the structures and components shown in Research Disclosure 37038. Specific photographic elements can be those shown on pages 96–98 of Research Disclosure 37038 as Color Paper Elements 1 and 2. A typical multicolor photographic element comprises a support bearing a cyan dye image-forming unit comprised of at least one red-sensitive silver halide emulsion layer having associated therewith at least one cyan dye-forming coupler, a magenta dye image-forming unit comprising at least one green-sensitive silver halide emulsion layer having associated therewith at least one magenta dye-forming coupler, and a yellow dye image-forming unit comprising at least one blue-sensitive silver halide emulsion layer having associated therewith at least one yellow dye-forming coupler. The element can contain additional layers, such as filter layers, interlayers, overcoat layers, subbing layers, and the like. All of these can be coated on a support which can be transparent (for example, a film support) or reflective (for example, a paper support). Support bases that can be used include both transparent bases, such as those prepared from polyethylene terephthalate, polyethylene naphthalate, cellulosics, such as cellulose acetate, cellulose diacetate, cellulose triacetate, and reflective bases such as paper, coated papers, melt-extrusion-coated paper, and laminated papers, such as those described in U.S. Pat. Nos. 5,853,965; 5,866,282; 5,874,205; 5,888,643; 5,888,681; 5,888,683; and 5,888,714. Photographic elements protected in accordance with the present invention may also include a magnetic recording material as described in *Research Disclosure,* Item 34390, November 1992, or a transparent magnetic recording layer such as a layer containing magnetic particles on the underside of a transparent support as described in U.S. Pat. Nos. 4,279,945 and 4,302,523.

Suitable silver halide emulsions and their preparation, as well as methods of chemical and spectral sensitization, are described in Sections I through V of Research Disclosure 37038. Color materials and development modifiers are described in Sections V through XX of Research Disclosure 37038. Vehicles are described in Section II of Research Disclosure 37038, and various additives such as brighteners, antifoggants, stabilizers, light absorbing and scattering materials, hardeners, coating aids, plasticizers, lubricants and matting agents are described in Sections VI through X and XI through XIV of Research Disclosure 37038. Processing methods and agents are described in Sections XIX and XX of Research Disclosure 37038, and methods of exposure are described in Section XVI of Research Disclosure 37038.

Photographic elements typically provide the silver halide in the form of an emulsion. Photographic emulsions generally include a vehicle for coating the emulsion as a layer of a photographic element. Useful vehicles include both naturally occurring substances such as proteins, protein derivatives, cellulose derivatives (e.g., cellulose esters), gelatin (e.g., alkali-treated gelatin such as cattle bone or hide gelatin, or acid treated gelatin such as pigskin gelatin), gelatin derivatives (e.g., acetylated gelatin, phthalated gelatin, and the like). Also useful as vehicles or vehicle extenders are hydrophilic water-permeable colloids. These include synthetic polymeric peptizers, carriers, and/or binders such as poly(vinyl alcohol), poly(vinyl lactams), acrylamide polymers, polyvinyl acetals, polymers of alkyl and sulfoalkyl acrylates and methacrylates, hydrolyzed polyvinyl acetates, polyamides, polyvinyl pyridine, methacrylamide copolymers, and the like.

Photographic elements can be imagewise exposed using a variety of techniques. Typically exposure is to light in the visible region of the spectrum, and typically is of a live image through a lens. Exposure can also be to a stored image (such as a computer stored image) by means of light emitting devices (such as LEDs, CRTs, etc.).

Images can be developed in photographic elements in any of a number of well known photographic processes utilizing any of a number of well known processing compositions, described, for example, in T. H. James, editor, *The Theory of the Photographic Process,* 4th Edition, Macmillan, New York, 1977. In the case of processing a color negative element, the element is treated with a color developer (that is one which will form the colored image dyes with the color couplers), and then with an oxidizer and a solvent to remove silver and silver halide. In the case of processing a color reversal element or color paper element, the element is first treated with a black and white developer (that is, a developer which does not form colored dyes with the coupler compounds) followed by a treatment to render developable unexposed silver halide (usually chemical or light fogging), followed by treatment with a color developer. Development is followed by bleach-fixing, to remove silver or silver halide, washing and drying.

Photographic images may also be produced using ink-jet printing. This printing technology is reviewed in an article titled "Progress and Trends in Ink-Jet Printing Technology" by Hue P. Le in the Journal of Imaging Science and Technology, Volume 42, Number 1 (January/February 1998), pp. 49–61. Essentially, ink droplets, typically in the volume range 1–100 picoliters, are ejected from a printhead to a receiver material on which the image is formed. The ink-jet printhead may be of the continuous or drop-on-demand varieties. Several physical mechanisms for drop ejection are known, but the currently most popular among these are thermal and piezoelectric. In the thermal mechanism, ink in the printhead is heated to form a water vapor bubble that expels one or more ink droplets out of the printhead toward the receiver. Representative thermal ink-jet printheads are described in, for example, U.S. Pat. No. 4,723,129 of Endo et al. (Canon) and U.S. Pat. No. 4,490,728 of Vaught et al. (Hewlett Packard). In the piezoelectric mechanism, one or more droplets are expelled from the printhead by a physical deformation that accompanies a voltage change across a piezoelectric material forming a part of the printhead structure. Representative piezoelectric printheads are described in, for example, U.S. Pat. No. 4,459,601 of Howkins (Exxon) and U.S. Pat. No. 5,563,634 of Masahiro et al. (Seiko Epson). Ink-jet inks may be either aqueous- or organic solvent-based. Aqueous inks are preferred for printing in home, office and retail environments. In addition to water and one or more colorants, such as dyes or pigments, an aqueous ink typically contains one or more humectants, which affect ink viscosity and volatility, one or more surfactants, which affect the wetting and penetrating properties of the ink, and a biocide, which extends the useful life of the ink. Aqueous inks may also contain many other ingredients, including metal ion chelating agents, pH buffers, defoamers, and dispersing agents. It is well known to improve the tone scale or bit depth of an image by using more than one ink density for each color. Representative ink-jet inks are described in, for example, U.S. Pat. No. 5,571,850 of Ma et al. (DuPont), U.S. Pat. No. 5,560,770 of Yatake (Seiko Epson), and U.S. Pat. No. 5,738,716 of Santilli et al. (Eastman Kodak). Ink-jet receivers may be reflective, transparent, or of intermediate transparency (e.g., for day/night display materials). At minimum, an ink-jet receiver includes a support and an ink receiving layer. The simplest ink-jet receiver is plain paper, in which these two functions are combined. As a practical matter, more complex receiver structures are required for improved image quality and physical properties. Specifically formulated ink receiving layers coated on paper or other supports improve color density and dot resolution. Receiver composition and structure may also be modified to improve properties such as wettability, ink absorptivity, drying time, gloss, reduced image artifacts, waterfastness, and light and dark stability. Representative ink-jet receiver structures and compositions are described in, for example, U.S. Pat. No. 4,954,395 of Hasegawa et al. (Canon), U.S. Pat. No. 5,725,961 of Ozawa et al. (Seiko Epson), and U.S. Pat. No. 5,605,750 of Romano et al. (Eastman Kodak).

The present invention is illustrated by the following examples.

EXAMPLES

Characterizations of Polymeric Materials

Glass Transition Temperature and Melting Temperature

Both glass transition temperature (Tg) and melting temperature (Tm) of the dry polymer material were determined by differential scanning calorimetry (DSC), using a heating rate of 20° C./minute. Tg is defined herein as the inflection point of the glass transition and Tm is defined herein as the peak of the melting transition.

Particle Size Measurement

All particles were characterized by Photon Correlation Spectroscopy using a Zetasizer Model DTS5100 manufactured by Malvern Instruments. Z-average particle sizes are reported.

Material preparation:

Polymers C1 to C11 are materials described in the prior art; C12 to C14 are polymers comprising 50% to 70% of the preferred monomer of formula (1), and are therefore outside the preferred composition of this invention. Polymers P1 to P14 are materials of this invention.

C1

Joncryl™HRC-1 645, a water based styrene acrylic polymer latex, was purchased from SC Johnson Polymer at 40% solids, and used as received. Glass transition temperatures were 15° C. and 80° C. (quoted from SC Johnson literature), average particle size obtained from PCS was 163 nm.

C2

Joncryl™2161, a water based styrene acrylic polymer latex, was purchased from SC Johnson Polymer at 48.5% solids, and used as received. Glass transition temperature was 90° C. (quoted from SC Johnson literature), average particle size obtained from PCS was 138 nm.

C3

Joncryl™1603, a water based styrene acrylic polymer latex, was purchased from SC Johnson Polymer at 40% solids, and used as received. Glass transition temperatures were 25° C. and 80° C. (quoted from SC Johnson literature), average particle size obtained from PCS was 85 nm.

C4

Joncryl™SCX 2500, a water based styrene acrylic polymer latex, was purchased from SC Johnson Polymer at 43% solids, and used as received. Minimum film formation temperature was 8° C. (quoted from SC Johnson literature).

C5

Joncryl™908, a water based styrene acrylic polymer latex, was purchased from SC Johnson Polymer at 43% solids, and used as received. Minimum film formation temperature was greater than 80° C. (quoted from SC Johnson literature).

C6

Joncryl™SCX 2560, a water based styrene acrylic polymer latex, was purchased from SC Johnson Polymer at 45.6% solids, and used as received. Minimum film formation temperature was less than 5° C. (quoted from SC Johnson literature).

C7 Acrylonitrile/Vinylidene Chloride/Acrylic Acid (15/79/6)

To a 400 ml glass bottle was added in order: (1) 222.5 g of de-mineralized water, degassed with nitrogen for 10 minutes, (2) 1.35 g of Triton™-770, (3) 4.93 g of acrylic acid, (4) 12.34 g of acrylonitrile, (5) 64.96 g of vinylidene chloride, (6) 0.204 g of potassium metabisulfate, and (7) 0.102 potassium persulfate. The bottle was sealed and put in a tumbler bath at 30° C. for 16–20 hours. The polymerized mixture was stripped under vacuum for 15 minutes at room temperature to remove residual volatile monomers. Glass transition temperature was 46° C. as measured by DSC, average particle size obtained from PCS was 97 nm.

C8

Witcobond™W-234, an aqueous polyurethane dispersion purchased from Witco Chemical Co. at 30% solids, used as received. Glass transition temperature was –39° C. as measured by DSC, average particle size obtained from PCS was 26 nm.

C9 Acrylonitrile/Vinylidene Chloride/Acrylic Acid (39/59/2)

This material was prepared in a similar way as for sample C7, except the weight of each individual monomer was 32.07 g of acrylonitrile, 48.52 g of vinylidene chloride and 1.64 g of acrylic acid. Glass transition temperature was 79 as measured by DSC, average particle size obtained from PCS was 85 nm.

C10 Acrylonitrile/2-Chloroethyl Acrylate (20/80)

A one-liter three-neck round-bottom reactor equipped with a condenser and mechanical stirrer was charged with 350 ml of de-ionized water and 0.83 grams of Rhodapex™CO-436 (58% solids). The reactor was immersed in a constant temperature bath at and purged with nitrogen for 30 minutes. 200 ml of de-ionized water, 0.83 grams of CO-436, 20.00 g of acrylonitrile and 80.00 g of 2-chloroethyl acrylate and 1.00 g of sodium persulfate were mixed in a 500 ml flask and homogenized for one minute. The monomer mixture was fed to the reactor over 2.5 hours. After the monomer feeding was finished, the polymerization was continued for one hour at 80° C. The latex was then cooled down and filtered. The % solids was 19.5% and the Z-average particle size was 68 nm. Glass transition temperature was 10° C. as measured by DSC.

C11 Acrylonitrile/2-Chloroethyl Acrylate/Acrylic Acid (50/45/5)

Into a one-liter three-neck round-bottom reactor equipped with a condenser and mechanical stirrer was charged 350 ml of de-ionized water and 0.83 grams of Rhodapex™CO436 (58% solids). The reactor was immersed in a constant temperature bath at 80° C. and purged with nitrogen for 30 minutes. 200 ml of de-ionized water, 0.83 grams of CO-436, 50.00 grams of acrylonitrile, 45.00 g of 2-chloroethyl acrylate, 5.00 g of acrylic acid and 1.00 g of sodium persulfate were mixed in a 500 ml flask and homogenized for one minute. The monomer mixture was fed to the reactor over 2.5 hours. After the monomer feeding was finished, the polymerization was continued for one hour at 80° C. The latex was then cooled down and filtered. The % solids was 12.0% and the Z-average particle size was 84 nm. Glass transition temperature was 49° C. as measured by DSC.

C12 Ethyl Acrylate/Vinylidene Chloride (30/70)

2700 g of deionized water and 13.33 g of Dowfax™2EP were charged to a 3-neck 5-liter round-bottom flask equipped with a mechanical stirrer, dry ice condenser, and nitrogen inlet. The solution was immersed in a constant temperature bath at 35° C. and purged with nitrogen for 30 minutes. 90 g of ethyl acrylate, 210 g of vinylidene chloride, 3 g of sodium persulfate, 3 g of sodium metabisulfite, and 0.05 g of ferrous sulfate were charged to the reactor and polymerized for 12 hours. The residual vinylidene chloride was removed by raising the temperature to 50° C. for one hour. The latex was then cooled and filtered. The % solids was 10.3%, and Z-average particle size was 29.7 nm. Glass transition temperature was 23° C.

C13 Ethyl Acrylate/Vinylidene Chloride (40/60)

The polymerization procedure was the same as C12 except 125 g of ethyl acrylate and 191 g of vinylidene chloride were used. The % solids was 10.8%, particle size was 30.5 nm and Tg was 18° C. as measured by DSC.

C14 Ethyl Acrylate/Vinylidene Chloride (50/50)

2700 g of deionized water and 15 g of Rhodacal™A-246L (Rhone-Poulenc) were charged to a 3-neck 5-liter round-bottom flask equipped with a mechanical stirrer, dry ice condenser, and nitrogen inlet. The solution was immersed in a constant temperature bath at 35° C. and purged with nitrogen for 30 minutes. 150 g of ethyl acrylate, 150 g of vinylidene chloride, 3 g of sodium persulfate, 3 g of sodium metabisulfite, and 0.05 g of ferrous sulfate were charged to the reactor and polymerized for 12 hours. The residual vinylidene chloride was removed by raising the temperature to 50° C. for one hour. The latex was then cooled and filtered. The % solids was 10.1%, particle size was 34.9 nm and Tg was 14° C.

P1 2-Chloroethyl Acrylate/Vinylidene Chloride/Itaconic Acid (9/89/2)

To a 400 ml glass bottle, added in order: (1) 222.5 g of demineralized water, degassed with nitrogen for 10 minutes, (2) 1.35 g of Triton™-770, (3) 1.64 g of itaconic acid, (4) 7.40 g 2-chloroethyl acrylate, (5) 73.18 of vinylidene chloride, (6) 0.204 g of potassium metabisulfate, and (7) 0.102 g sodium persulfate. The bottle was sealed and put in a tumbler bath at 30° C. for 16–20 hours. The polymerized mixture was stripped under vacuum for 15 minutes at room temperature to remove residual volatile monomers. Average particle size obtained from PCS was 103 nm and Tg was 14° C.

P2 2-Chloroethyl Acrylate/Vinylidene Chloride/Itaconic Acid (12/86/2)

To a 400 ml glass bottle, added in order: (1) 222.5 g of demineralized water, degassed with nitrogen for 10 minutes, (2) 1.35 g of Triton™-770, (3) 1.64 g of itaconic acid, (4) 9.87 g 2-chloroethyl acrylate, (5) 70.72 g of vinylidene chloride, (6) 0.204 g of potassium metabisulfate, and (7) 0.102 g sodium persulfate. The bottle was sealed and put in a tumbler bath at 30° C. for 16–20 hours. The polymerized mixture was stripped under vacuum for 15 minutes at room temperature to remove residual volatile monomers. Average particle size obtained from PCS was 103 nm and Tg was 14° C.

P3 2-Chloroethyl Acrylate/Vinylidene Chloride/Itaconic Acid (15/83/2)

To a 400 ml glass bottle, added in order: (1) 222.5 g of demineralized water, degassed with nitrogen for 10 minutes, (2) 1.35 g of Triton™-770, (3) 1.64 g of itaconic acid, (4) 12.33 g 2-chloroethyl acrylate, (5) 68.25 g of vinylidene chloride, (6) 0.204 g of potassium metabisulfate, and (7) 0.102 g sodium persulfate. The bottle was sealed and put in a tumbler bath at 30° C. for 16–20 hours. The polymerized mixture was stripped under vacuum for 15 minutes at room temperature to remove residual volatile monomers. Glass transition temperature was 12° C. as measured by DSC, average particle size obtained from PCS was 100 nm.

P4 Ethyl Acrylate/Vinylidene Chloride/Itaconic Acid (15/83/2)

To a 400 ml glass bottle, added in order: (1) 222.5 g of demineralized water, degassed with nitrogen for 10 minutes, (2) 1.35 g of Triton™-770, (3) 1.64 g of itaconic acid, (4) 12.33 g beta-cyanoethyl acrylate, (5) 68.25 g of vinylidene chloride, (6) 0.204 g of potassium metabisulfate, and (7) 0.102 g sodium persulfate. The bottle was sealed and put in a tumbler bath at 30° C. for 16–20 hours. The polymerized mixture was stripped under vacuum for 15 minutes at room temperature to remove residual volatile monomers. Glass transition temperature was 20° C. as measured by DSC.

P5 Ethyl Acrylate/Vinylidene Chloride/Itaconic Acid (18/80/2)

To a 400 ml glass bottle, added in order: (1) 222.5 g of demineralized water, degassed with nitrogen for 10 minutes, (2) 1.35 g of Triton™-770, (3) 1.64 g of itaconic acid, (4) 14.81 g beta-cyanoethyl acrylate, (5) 65.78 g of vinylidene chloride, (6) 0.204 g of potassium metabisulfate, and (7) 0.102 g sodium persulfate. The bottle was sealed and put in a tumbler bath at 30° C. for 16–20 hours. The polymerized mixture was stripped under vacuum for 15 minutes at room temperature to remove residual volatile monomers. Glass transition temperature was 22° C. as measured by DSC, average particle size obtained from PCS was 79 nm.

P6 (Acrylonitrile/Vinylidene Chloride/n-Butyl Methacrylate/Itaconic Acid (5/80/13/2)

To a one-liter three-neck round-bottom flask equipped with a dry ice condenser and mechanical stirrer were added with 304 g of deionized water and 2 g of Rhodacal™-246LRhone-Poulenc). The system was immersed in a 35° C. bath and purged with nitrogen for 30 minutes. Eight grams of acrylonitrile, 20.8 g of n-butylmethacrylate, 3.2 g of itaconic acid, and 128 g of vinylidene chloride, 5.6 g of 10% sodium persulfate, 5.6 g of 10% sodium metabisulfite, and 0.43 g of 1% ferrous sulfate were charged to the reactor and polymerized at 35° C. for 12 hours. The residual monomers were removed with rotary evaporator. The % solids was 33.2%, Tg was 21° C. as measured by DSC, average particle size obtained from PCS was 66 nm.

P7 n-Butyl Methacrylate/Vinylidene Chloride/Itaconic Acid (15/83/2)

To a 400 ml glass bottle, added in order: (1) 222.5 g of demineralized water, degassed with nitrogen for 10 minutes, (2) 1.35 g of Triton™-770, (3) 1.64 g of itaconic acid, (4) 12.33 n-butyl methacrylate, (5) 68.25 g of vinylidene chloride, (6) 0.204 g of potassium metabisulfate, and (7) 0.102 g sodium persulfate. The bottle was sealed and put in a tumbler bath at 30° C. for 16–20 hours. The polymerized mixture was stripped under vacuum for 15 minutes at room temperature to remove residual volatile monomers. Glass transition temperature was 11° C. as measured by DSC, average particle size obtained from PCS was 138 nm.

P8 n-Butyl Methacrylate/Vinylidene Chloride/Itaconic Acid (10/88/2)

To a 400 ml glass bottle, added in order: (1) 222.5 g of demineralized water, degassed with nitrogen for 10 minutes, (2) 1.35 g of Triton™- 770, (3) 1.64 g of itaconic acid, (4)

8.22 n-butyl methacrylate, (5) 72.36 g of vinylidene chloride, (6) 0.204 g of potassium metabisulfate, and (7) 0.102 g sodium persulfate. The bottle was sealed and put in a tumbler bath at 30° C. for 16–20 hours. The polymerized mixture was stripped under vacuum for 15 minutes at room temperature to remove residual volatile monomers. Glass transition temperature was 12° C. as measured by DSC, average particle size obtained from PCS was 82 nm.

P9 Ethyl Acrylate/Vinylidene Chloride/Itaconic Acid (10/88/2)

To a 20-gallon, stainless-steel reactor added 44 kg of demineralized water. The system was purged for 15–30 minutes with nitrogen. The temperature was set at 15° C. and the stirrer was set at 150 RPM. The following were added to the reactor in order: 104.6 g potassium metabisulfite dissolved in 500 ml demineralized water, 421.9 g itaconic acid, 2109.5 g ethylacrylate, 18.56 kg of vinylidene chloride, 469 g of Dowfax™2EP rinsed in with 1 kg demineralized water, and 104.6 g potassium persulfate dissolved in 1.5 kg demineralized water. The reactor port and the vent were closed. The reactor was pressurized to 2 psi with nitrogen. The internal temperature was set to 40° C., and held there for 16–20 hours. The product was then cooled to 20° C., and the vacuum was broken with nitrogen. The product was filtered through cheesecloth. Glass transition temperature was 9° C. as measured by DSC, average particle size obtained from PCS was 77 nm.

P10 Ethyl Acrylate/Vinylidene Chloride/Itaconic Acid (12/86/2)

To a 400 ml glass bottle, added in order: (1) 222.5 g of demineralized water, degassed with nitrogen for 10 minutes, (2) 1.35 g of Triton™-770, (3) 1.64 g of itaconic acid, (4) 9.87 g of ethyl acrylate, (5) 70.72 g of vinylidene chloride, (6) 0.204 g of potassium metabisulfate, and (7) 0.102 g sodium persulfate. The bottle was sealed and put in a tumbler bath at 30° C. for 16–20 hours. The polymerized mixture was stripped under vacuum for 15 minutes at room temperature to remove residual volatile monomers. Glass transition temperature was 11° C. as measured by DSC, average particle size obtained from PCS was 97 nm.

P11 Ethyl Acrylate/Vinylidene Chloride/Itaconic Acid (15/83/2)

To a 400 ml glass bottle, added in order: (1) 222.5 g of demineralized water, degassed with nitrogen for 10 minutes, (2) 1.35 g of Triton™-770, (3) 1.64 g of itaconic acid, (4) 12.33 g of ethyl acrylate, (5) 68.25 g of vinylidene chloride, (6) 0.204 g of potassium metabisulfate, and (7) 0.102 g sodium persulfate. The bottle was sealed and put in a tumbler bath at 30° C. for 16–20 hours. The polymerized mixture was stripped under vacuum for 15 minutes at room temperature to remove residual volatile monomers. Glass transition temperature was 14° C. as measured by DSC, average particle size obtained from PCS was 113 nm.

P12 Ethyl Acrylate/Vinylidene Chloride/Hydroxyethyl Acrylate (8188/4)

To a 250-ml three-neck round-bottom flask equipped with a dry ice condenser and mechanical stirrer were added 68.2 g of deionized water and 1.02 g of Triton™770. The system was immersed in a 35° C. bath and purged with nitrogen for 30 minutes. 1.22 g of hydroxyethylacrylate, 2.45 g of ethylacrylate, 26.9 g of vinylidene chloride, 1.5 g of 10% potassium persulfate, and 1.5 g of 10% potassium metabisulfite were charged to the reactor and polymerized at 35° C. for 12 hours. The residual monomers were removed with a rotary evaporator. The % solids was 28.5%, particle size was 85.4 mn and Tg was 10° C.

P13 Ethyl Acrylate/inylidene Chloride/Hydroxyethyl Acrylate (10/85/5)

To a 20-ounce polyethylene bottle was added 341 g of demineralized water. The water was purged for 15–20 minutes with nitrogen. The following were added to the reactor in order: 5.10 g 30% Triton™770, 7.645 g hydroxyethyl acrylate, 15.29 g ethylacrylate, 130.0 g vinylidene chloride, 0.7586 g potassium metabisulfite, and 0.3794 g potassium persulfate. The bottle was capped and placed in a tumbler bath at 40° C., and held there for 16–20 hours. The product was then removed from the bath, and cooled to 20° C. The product was filtered through cheesecloth. Glass transition temperature was 9° C. as measured by DSC, average particle size obtained from PCS was 88 nm.

P14 Ethyl Acrylate/Vinylidene Chloride/Hydroxyethyl Acrylate (6/90/4)

To a 20-ounce polyethylene bottle was added 341 g of demineralized water. The water was purged for 15–20 minutes with nitrogen. The following were added to the reactor in order: 5.10 g 30% Triton™770, 6.12 g hydroxyethyl acrylate, 9.18 g ethylacrylate, 137.64 g vinylidene chloride, 0.7586 g potassium metabisulfite, and 0.3794 g potassium persulfate. The bottle was capped and placed in a tumbler bath at 40° C., and held there for 16–20 hours. The product was then removed from the bath, and cooled to 20° C. The product was filtered through cheesecloth. Glass transition temperature was 12° C. as measured by DSC, average particle size obtained from PCS was 90 nm.

Wax-1

Jonwax™26, an aqueous dispersion of high density polyethylene wax particles, was purchased from SC Johnson at 25% solids and used as received. The melting point of this wax was 130° C. and the average particle size was 58 nm.

Wax-2

ME39235, an aqueous dispersion of high density polyethylene wax particles, was purchased Michelman at 35% solids and used as received. The melting point of this wax was 129° C. and the average particle size was 53 nm.

Wax-3

ML160, an aqueous dispersion of carnauba wax particles, was purchased Michelman at 25% solids and used as received. The melting point of this wax was 88° C. and the average particle size was 109 nm.

Sample Preparation

Kodak Edge 7 Ektacolor™ paper was exposed with a step tablet wedge to three different colors (red, green and blue) on a Kodak Automatic 312 Color Printer and processed by HOPE 3026 processor using RA-4 chemicals to provide cyan, magenta and yellow colors.

All samples were prepared by coating aqueous colloidal dispersions on the exposed/processed Kodak Edge 7 Ektacolor™ paper described above at 3.0 cc/sq.ft. with a dryer temperature of 140° F. to simulate the photofinishing process. Surfactant FT-248 (available from Bayer) was used at the dry lay downs of 2 mg per square foot respectively in all formulations to control the surface tension of the coating fluid. Waxes were used in formulations to control the friction characteristics of the protective overcoat surface.

Examples on a porous type of ink-jet receiver were prepared by methods similar to those used for color photographic paper, to apply coatings to Konica QP™ receiver imaged using an Epson 740™ ink-jet printer and Epson inks. Examples on a continuous gelatin-based ink-jet receiver were prepared by methods similar to those used for color photographic paper, to apply coatings to receiver imaged using a Hewlett-Packard Photosmart™ ink-jet printer and Photosmart™ inks.

Sample Testing

Test for Water Resistance

Ponceau Red dye is known to stain gelatin through ionic interaction. Ponceau red dye solution was prepared by dissolving 1 gram of dye in 1000 grams mixture of acetic acid and water (5 parts: 95 parts). Samples were soaked in the dye solution for 5 minutes followed by a 30-second water rinse to removed excess dye solution on the coating surface, then air dried. A sample with a good water-resistant protective layer does not change in appearance by this test. Samples showed very dense red color if there was no protective overcoat applied to the surface or the formulation did not form a protective overcoat layer to provide the water resistance property.

Test for Durability on Wet Wiping

An approximately 1 cm-diameter Ponceau Red dye solution was placed on the sample surface for 10 minutes. The liquid was then wiped up with Sturdi-Wipes paper towel with approx. 1000 grams weight applied on it. Several phenomena were often observed.

A: no mark of surface scratches was observed.
B: very mild scratches on the protective overcoat layer were observed.
C: very severe scratches on the protective overcoat layer were observed.
D: protective overcoat layer was removed by wiping and Ponceau red dye penetrated into image layers to give a red mark.

A visual observation was recorded. "A" is most desirable and "B" is acceptable. A result of "C" or "D" is not acceptable at all.

Test for Dry Scratch Resistance

Each sample was rubbed with a dry paper towel for 40 passes under a pressure of 0.75 psi (500 grams over a 1.375 inch-diameter area). The scratches generated by the rubbing test were rated according to the description below. Ratings higher than 5 are desirable.

Scratch Resistance Ratings

0 . . . Totally abraded/worn
1 . . . Dense scratches with associated haze band
2 . . . Numerous scratches with associated haze band
3 . . . Few scratches with associated haze band
4 . . . Dense, heavy scratches
5 . . . Nunerous, heavy scratches
6 . . . Few, heavy scratches
7 . . . Dense, heavy scratches
8 . . . Numerous, light scratches
9 . . . Few, light scratches
10 . . . No visible damage Test for Thermal Blocking 3.5×4 sq. in. samples were preconditioned in 50% RH/60° C. for 1 hour, then placed face-to-face (the overcoat layer of one sample being in contact with the same overcoat of the other sample) in 50% RH/60° C. condition for additional 6 hours with 1000 grams weight placed on top of the samples. The samples were pulled apart and evaluated according to the following scale:

10 . . . no adhesion, no tack
9 . . . very slight tack (aural observation)
8 . . . slight tack (aural observation)
7 . . . slight picking (visual observation)
6 . . . moderate picking
5 . . . significant picking
4 . . . 0–25% coating removal
3 . . . 25–50% coating removal
2 . . . 50–75% coating removal
1 . . . 100% coating removal (i.e. complete failure)

A ranking of 10 is most desirable, a ranking of 7 to 9 is also acceptable.

Test for Fingerprint Resistance

Thermaderm, a specially formulated mixture (see preparation below) to mimic fingerprint oil, was applied to the surface of the protective overcoat by smearing with a finger at approx. 1 mg thermaderm over an area of 1 sq.cm. The sample was left for 24 hours in room condition (often 70° F./50% RH) and then wiped with cotton cloth to clean up the surface. The test area was ranked according to the following phenomenon.

A: no mark of fingerprints was observed.
B: very mild/faint fingerprints on the protective overcoat layer was observed.
C: very obvious fingerprint mark by Thernaderm on the protective overcoat layer was observed.
D: protective overcoat layer was removed on wiping.

A ranking of "A" is most desirable, "B" is acceptable, "C" and "D" are not acceptable at all.

Thermaderm Formulation

| Non-aqueous Phase | |
| --- | --- |
| Corn oil | 78.96 grams |
| Mineral oil | 25.26 grams |
| Glycerin | 52.64 grams |
| Stearyl alcohol | 15.79 grams |
| Oleic acid | 63.16 grams |
| Sorbitan monooleate | 21.05 grams |
| Cetyl palmitate | 6.32 grams |
| Oleyl alcohol | 6.32 grams |
| Stearic acid | 31.58 grams |
| Lexemul AR | 47.36 grams |
| Cholesterol | 9.47 grams |
| Methylparaben | 4.21 grams |
| Butyl paraben | 3.16 grams |
| Butylated hydroxytoluene | 0.21 grams |
| Butylated hydroxyanisole | 0.21 grams |
| Vitamin E acetate | 0.13 grams |
| Cetyl alcohol | 15.79 grams |
| Squalene | 15.79 grams |
| Aqueous Phase | |
| Pegosperse 1750 MS-K | 31.58 grams |
| Distilled water | 571.01 grams |

1. Ingredients were added in the order listed. The corn oil was carefully heated using a warm water bath to aid in the dissolution of the non-aqueous phase.

2. Aqueous phase was warmed to aid in the dissolution of the Pegosperse.

3. Aqueous phase was quickly added to the non-aqueous phase with vigorous agitation.

The resultant suspension was then partially emulsified with an air powered Polytron™ for approximately 5 minutes.

4. Complete emulsification was accomplished by processing through a microfluidizer.

5. After preparation store material in tightly sealed container. Keep frozen, removing a small quantity from jar as needed.

Example 1

A series of samples were prepared with the protective overcoat formulation described in Table 1. Samples PP1 through PP24 used photographic paper, and samples IJ-25 through IJ-28 used ink-jet receiver material.

TABLE 1

| Sample ID | Description | Overcoat Composition (@ mg/sq.ft.) | Water Resistance | Wet Wipe Durability | Dry Scratch Durability | Fingerprint Resistance | Thermal Blocking |
|---|---|---|---|---|---|---|---|
| PP-1 | Edge 7 without inventive overcoat | None | No | Very poor | | C | 10 |
| PP-2 | similar to examples shown in U.S. Pat. No. 5,376,434 | C1 @ 78 C2 @ 26 C3 @ 156 Wax-1 @ 39 | Yes | A | 8 | D | 8 |
| PP-3 | similar to examples shown in U.S. Pat. No. 5,376,434 | C4 @ 180 C5 @ 80 Wax-1 @ 39 | Yes | A | 8 | C | 7 |
| PP-4 | similar to examples shown in U.S. Pat. No. 5,376,434 | C6 @ 130 C2 @ 130 Wax-1 @ 39 | Yes | B/C | 8 | C | 8 |
| PP-5 | example in U.S. Ser. No. 09/136,375 | C7 @ 130 C8 @ 130 Wax-1 @ 39 | Yes | A | 8 | A | 4 |
| PP-6 | example in U.S. Ser. No. 09/136,375 | C9 @ 130 C10 @ 130 Wax-1 @ 39 | Yes | A | 7 | B | 4 |
| PP-7 | example in U.S. Ser. No. 09/136,375 | C11 @ 130 C10 @ 130 Wax-2 @ 39 | Yes | A | 8 | B | 6 |
| PP-8 | Invention | P1 @ 260 Wax-2 @ 39 | Yes | B | 8 | A | 9 |
| PP-9 | Invention | P2 @ 260 Wax-2 @ 39 | Yes | A | 7 | A | 8 |
| PP-10 | Invention | P3 @ 260 Wax-2 @ 39 | Yes | B | 9 | A | 9 |
| PP-11 | Invention | P4 @ 260 Wax-2 @ 39 | Yes | B | 8 | A | 9 |
| PP-12 | Invention | P5 @ 260 Wax-2 @ 39 | Yes | A | 8 | A | 8 |
| PP-13 | Invention | P6 @ 200 Wax-1 @ 39 | Yes | B | 9 | A | 7 |
| PP-14 | Invention | P7 @ 200 Wax-1 @ 39 | Yes | A | 9 | A | 10 |
| PP-15 | Invention | P8 @ 200 Wax-1 @ 39 | Yes | A | 9 | A | 9 |
| PP-16 | Invention | P9 @ 200 Wax-1 @ 10 Wax-3 @ 10 | Yes | A | 5 | A | 10 |
| PP-17 | Invention | P10 @ 260 Wax-1 @ 10 Wax-3 @ 10 | Yes | A | 9 | A | 9 |
| PP-18 | Invention | P11 @ 200 Wax-1 @ 10 Wax-3 @ 10 | Yes | A | 5 | A | 10 |
| PP-19 | Invention | P12 @ 200 Wax-1 @ 10 Wax-3 @ 10 | Yes | A | 5 | A | 10 |
| PP-20 | Invention | P13 @ 200 Wax-1 @ 10 Wax-3 @ 10 | Yes | A | 4 | A | 10 |
| PP-21 | Invention | P14 @ 200 Wax-1 @ 10 Wax-3 @ 10 | Yes | A | 6 | A | 9 |
| PP-22 | comparison | C12 @ 200 Wax-1 @ 10 Wax-3 @ 10 | Yes | A | 6 | B | 6 |

TABLE 1-continued

| Sample ID | Description | Overcoat Composition (@ mg/sq.ft.) | Water Resistance | Wet Wipe Durability | Dry Scratch Durability | Fingerprint Resistance | Thermal Blocking |
|---|---|---|---|---|---|---|---|
| PP-23 | comparison | C13 @ 200<br>Wax-1 @ 10<br>Wax-3 @ 10 | Yes | A | 5 | B | 6 |
| PP-24 | comparison | C14 @ 200<br>Wax-1 @ 10<br>Wax-3 @ 10 | Yes | A | 5 | B | 6 |
| IJ-25 | porous ink-jet receiver without inventive overcoat | none | No | B/C | 8 | C | N.A. |
| IJ-26 | porous ink-jet receiver with inventive overcoat | P9 @ 200<br>Wax-1 at 10<br>Wax-2 @ 10 | Yes | A | 9 | A | N.A. |
| IJ-27 | gelatin-based ink-jet receiver without inventive overcoat | none | No | Very Poor | Very Poor | C | N.A. |
| IJ-28 | gelatin-based ink-jet receiver with inventive overcoat | P9 @ 200<br>Wax-1 at 10<br>Wax-2 @ 10 | Yes | B | 4 | A | N.A. |

As presented in Table 1, sample PP-1 is the Edge 7 sample without a latex overcoat, and therefore does not possess water resistance property, nor fingerprint resistance.

Samples PP-2 to PP-4 are similar to examples demonstrated in U.S. Pat. No 5,376,434, which consists of at least two latices in the overcoat composition, one having Tg below 30° C. and one having Tg above 80° C.. The introduction of the high Tg latex was needed to avoid the tackiness in high temperature condition. However, none of them has desirable fingerprint resistance property due to the lack of vinylidene chloride comonomers in the composition.

Samples PP-5 to PP-7 were the reproduction of examples from U.S. Ser. No. 09/136,375. C7 and C9 are vinylidene chloride copolymers having Tg higher than 30° C., therefore required a second, lower Tg latex in the overcoat composition in order to form a continuous film for water resistance. Even though these materials were designed to have satisfactory fingerprint resistance, their thermal blocking resistance was poor as shown by the low ranking in thermal blocking. This invention can be clearly demonstrated by samples PP-8 through PP-21, where only one latex was needed in the overcoat composition. All latices consisted of 75% to 95% by weight of vinylidene chloride comonomer in the polymer composition. These samples all possessed superior fingerprint resistance property and thermal blocking resistance. In addition, they retained water resistance and scratch resistance properties most desirable for print protection.

Samples PP-22 to PP-24 were also prepared from vinylidene chloride copolymer latices, however, the vinylidene chloride was less than 75% by weight in polymer composition. It is shown in the results that these samples were less resistant to fingerprint damage, and tackier in the high temperature condition such as 60° C. and 50% RH, than those samples of the present invention.

Samples IJ-26 and IJ-28 demonstrated improvements in water resistance, wet and dry durability, and fingerprint resistance in comparison to unprotected ink-jet imaging materials IJ-25 and IJ-27, respectively.

Example 2

Two different photographic papers listed below were used to prepare samples of this invention.

(1) Kodak Ektacolor Edge 7
(2) experimental photographic paper

Experimental photographic paper A was prepared by coating blue-light sensitive layer, interlayer, green-light sensitive layer, interlayer, red-light sensitive layer, UV layer and overcoat simultaneously utilizing curtain coating on polyethylene laminated photographic paper support. Coupler dispersions were emulsified by methods well known to the art. The components in each individual layer are described below.

Blue Sensitive Emulsion (Blue EM-1)

A high chloride silver halide emulsion is precipitated by adding approximately equimolar silver nitrate and sodium chloride solutions into a well stirred reactor containing glutaryldiaminophenyldisulfide, gelatin peptizer and thioether ripener. Cesium pentachloronitrosylosmate(II) dopant is added during the silver halide grain formation for most of the precipitation, followed by the addition of potassium hexacyanoruthenate(II), potassium (5-methylthiazole)-pentachloroiridate, a small amount of KI solution, and shelling without any dopant. The resultant emulsion contains cubic shaped grains having edge length of 0.6 micrometers. The emulsion is optimally sensitized by the addition of a colloidal suspension of aurous sulfide and heat ramped to 60° C. during which time blue sensitizing dye BSD-4, potassium hexchloroiridate, Lippmann bromide and 1-(3-acetamidophenyl)-5-mercaptotetrazole were added.

Green Sensitive Emulsion (Green EM-1)

A high chloride silver halide emulsion is precipitated by adding approximately equimolar silver nitrate and sodium chloride solutions into a well stirred reactor containing, gelatin peptizer and thioether ripener. Cesium pentachloronitrosylosmate(II) dopant is added during the silver halide grain formation for most of the precipitation, followed by the addition of potassium (5-methylthiazole)-pentachloroiridate. The resultant emulsion contains cubic shaped grains of 0.3 micrometers in edge length size. The emulsion is optimally sensitized by the addition of glutaryldiaminophenyldisulfide, a colloidal suspension of aurous sulfide and heat ramped to 55° C. during which time potassium hexachloroiridate doped Lippmann bromide, a liquid crystalline suspension of green sensitizing dye GSD-1, and 1-(3-acetamidophenyl)-5-mercaptotetrazole were added.

Red Sensitive Emulsion (Red EM-1)

A high chloride silver halide emulsion is precipitated by adding approximately equimolar silver nitrate and sodium chloride solutions into a well stirred reactor containing gelatin peptizer and thioether ripener. During the silver halide grain formation, potassium hexacyanoruthenate(II) and potassium (5-methylthiazole)-pentachloroiridate are added. The resultant emulsion contains cubic shaped grains of 0.4 micrometers in edge length size. The emulsion is optimally sensitized by the addition of glutaryldiaminophenyldisulfide, sodium thiosulfate, tripotassium bis {2-[3-(2-sulfobenzamido)phenyl]-mercaptotetrazole) gold(I) and heat ramped to 64° C. during which time 1-(3-acetamidophenyl)-5-mercaptotetrazole, potassium hexachloroiridate, and potassium bromide are added. The emulsion is then cooled to 40° C., pH adjusted to 6.0 and red sensitizing dye RSD-1 is added.

TABLE 2

| Layer | Item | Laydown (mg/ft$^2$) |
|---|---|---|
| Layer 1 | Blue Sensitive Layer | |
| | Gelatin | 122.0 |
| | Blue sensitive silver (Blue EM-1) | 22.29 |
| | Y-4 | 38.49 |
| | ST-23 | 44.98 |
| | Tributyl Citrate | 20.24 |
| | ST-24 | 11.25 |
| | ST-16 | 0.883 |
| | Sodium Phenylmercaptotetrazole | 0.009 |
| | Piperidino hexose reductone | 0.2229 |
| | 5-chloro-2-methyl-4-isothiazolin-3-one/2-methyl-4-isothiazolin-3-one(3/1) | 0.019 |
| | SF-1 | 3.40 |
| | Potassium chloride | 1.895 |
| | Dye-1 | 1.375 |
| Layer 2 | Interlayer | |
| | Gelatin | 69.97 |
| | ST-4 | 9.996 |
| | S-4 | 18.29 |
| | 5-chloro-2-methyl-4-isothiazolin-3-one/2-methyl-4-isothiazolin-3-one(3/1) | 0.009 |
| | Catechol disulfonate | 3.001 |
| | SF-1 | 0.753 |
| Layer 3 | Green Sensitive Layer | |
| | Gelatin | 110.96 |
| | Green sensitive silver (Green EM-1) | 9.392 |
| | M-4 | 19.29 |
| | Oleyl Alcohol | 20.20 |
| | S-4 | 10.40 |
| | ST-21 | 3.698 |
| | ST-22 | 26.39 |
| | Dye-2 | 0.678 |
| | 5-chloro-2-methyl-4-isothiazolin-3-one/2-methyl-4-isothiazolin-3-one(3/1) | 0.009 |
| | SF-1 | 2.192 |

TABLE 2-continued

| Layer | Item | Laydown (mg/ft$^2$) |
|---|---|---|
| | Potassium chloride | 1.895 |
| | Sodium Phenylmercaptotetrazole | 0.065 |
| Layer 4 | M/C Interlayer | |
| | Gelatin | 69.97 |
| | ST-4 | 9.996 |
| | S-4 | 18.29 |
| | Acrylamide/t-Butylacrylamide sulfonate copolymer | 5.026 |
| | Bis-vinylsulfonylmethane | 12.91 |
| | 3,5-Dinitrobenzoic acid | 0.009 |
| | Citric acid | 0.065 |
| | Catechol disulfonate | 3.001 |
| | 5-chloro-2-methyl-4-isothiazolin-3-one/2-methyl-4-isothiazolin-3-one(3/1) | 0.009 |
| Layer 5 | Red Sensitive Layer | |
| | Gelatin | 125.96 |
| | Red Sensitive silver (Red EM-1) | 17.49 |
| | IC-35 | 21.59 |
| | IC-36 | 2.397 |
| | UV-1 | 32.99 |
| | Dibutyl sebacate | 40.49 |
| | S-6 | 13.50 |
| | Dye-3 | 2.127 |
| | Potassium p-toluenethiosulfonate | 0.242 |
| | 5-chloro-2-methyl-4-isothiazolin-3-one/2-methyl-4-isothiazolin-3-one(3/1) | 0.009 |
| | Sodium Phenylmercaptotetrazole | 0.046 |
| | SF-1 | 4.868 |
| Layer 6 | UV Overcoat | |
| | Gelatin | 76.47 |
| | UV-2 | 3.298 |
| | UV-1 | 18.896 |
| | ST-4 | 6.085 |
| | SF-1 | 1.162 |
| | S-6 | 7.404 |
| | 5-chloro-2-methyl-4-isothiazolin-3-one/2-methyl-4-isothiazolin-3-one(3/1) | 0.009 |
| Layer 7 | SOC | |
| | Gelatin | 59.98 |
| | Ludox AM ™ (colloidal silica) | 14.99 |
| | Polydimethylsiloxane (DC200 ™) | 1.877 |
| | 5-chloro-2-methyl-4-isothiazolin-3-one/2-methyl-4-isothiazolin-3-one(3/1) | 0.009 |
| | SF-2 | 0.297 |
| | Tergitol 15-S-5 ™ (surfactant) | 0.186 |
| | SF-1 | 0.753 |
| | Aerosol OT ™ (surfactant) | 0.269 |

IC-35

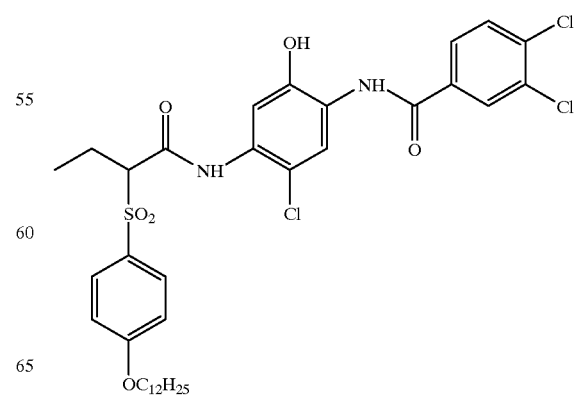

IC-36
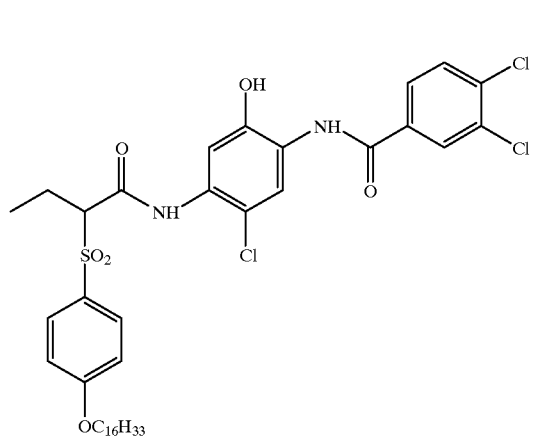
M-4
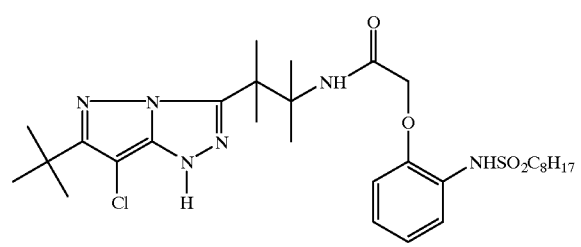
Y-4
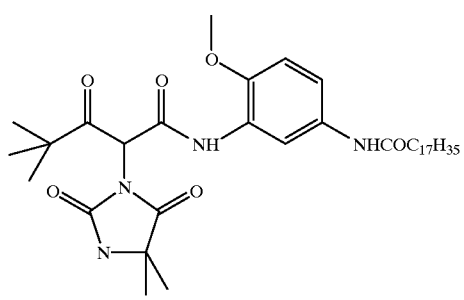
ST-16
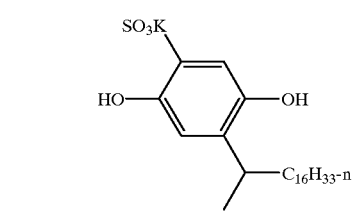
ST-4
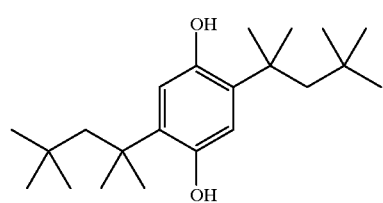
ST-21
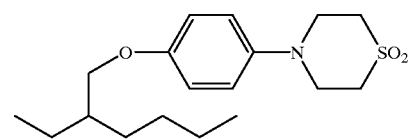
ST-22
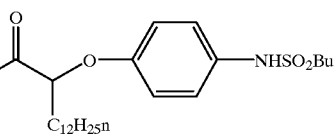
ST-23
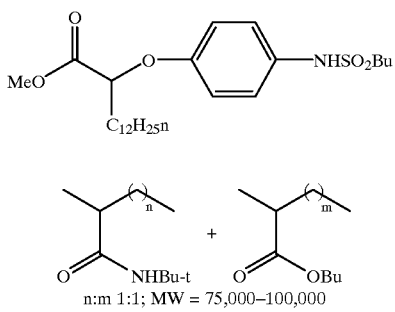
n:m 1:1; MW = 75,000–100,000
ST-24
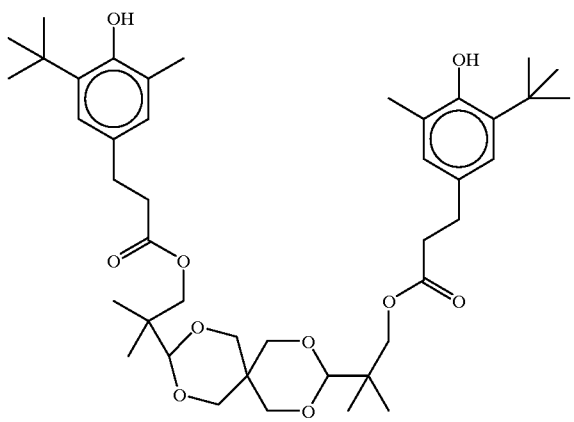
UV-1
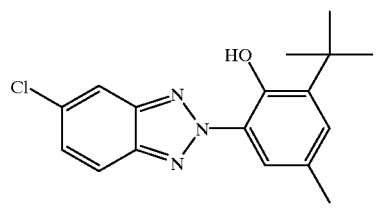
UV-2
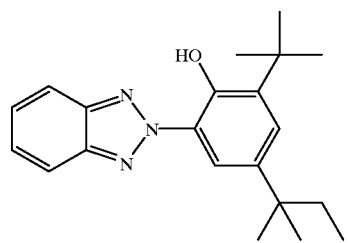
SF-1
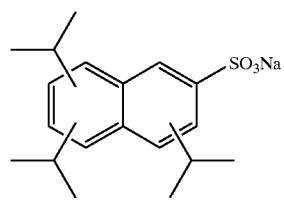
S-4 = Diundecyl phthalate
S-6 = Tris(2-ethylhexyl)phosphate
SF-2
$CF_3 \cdot (CF_2)_7 \cdot SO_3Na$ BSD-4
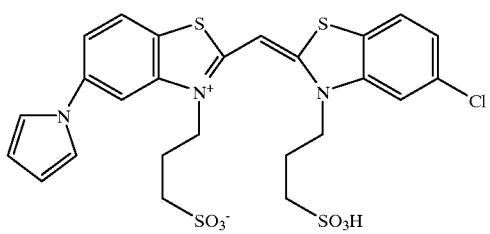

GSD-1
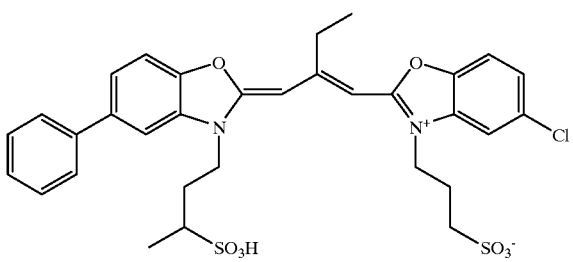

RSD-1
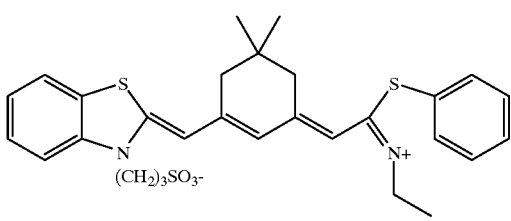

DYE-1
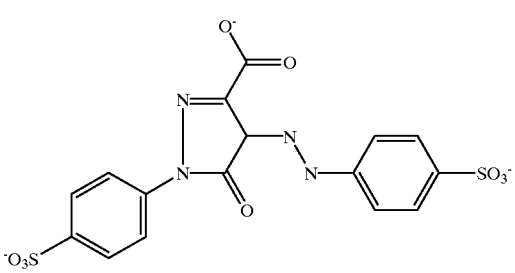

DYE-2
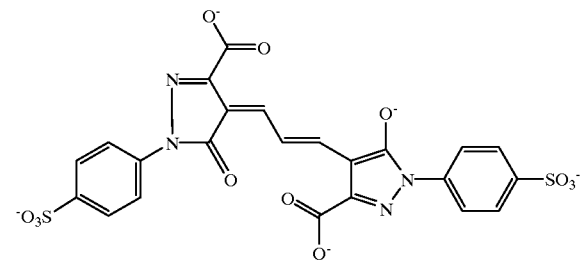

DYE-3

The overcoat formula exemplified by Sample 16 in Table 1 was coated on each of the two papers, and the results are shown in Table 3.

TABLE 3

| Sample ID | Description | Overcoat Composition (@ mg/sq.ft.) | Water Resistance | Wet Wipe Durability | Dry Scratch Durability | Fingerprint Resistance | Thermal Blocking |
|---|---|---|---|---|---|---|---|
| 2.1 | Edge 7 without latex overcoat | None | No | Very poor | 4 | C | 10 |
| 2.2 | Edge 7 with inventive overcoat | P9 @ 200 Wax-1 @ 10 Wax-3 @ 10 | Yes | A | 5 | A | 10 |
| 2.3 | Experimental photographic paper A without latex overcoat | None | No | Very poor | 4 | C | 10 |
| 2.4 | Experimental photographic paper A with inventive overcoat | P9 @ 200 Wax-1 @ 10 Wax-3 @ 10 | Yes | A | 5 | A | 10 |

It is evident from Table 3 that the overcoats of this invention applied to experimental paper A provide excellent water resistance, fingerprint resistance and durability without compromising the blocking resistance at high temperature.

Example 3

Two different photographic papers listed below were used to prepare samples of this invention.

(1) experimental photographic paper B
(2) experimental photographic paper C

Experimental photographic paper B was prepared identical to Kodak Ektacolor Edge™ 7 in image layers, except the paper support used was biaxially oriented support including a paper base and a biaxially oriented polypropylene sheet laminated to both sides of the paper base.

Experimental photographic paper C was prepared identical to experimental photographic paper A in image layers, except the paper support used was biaxially oriented support including a paper base and a biaxially oriented polypropylene sheet laminated to both sides of the paper base.

The overcoat formula exemplified by Sample 16 in Table 1 was coated on each of the two papers, and the results are shown in Table 4.

TABLE 4

| Sample ID | Description | Overcoat Composition (@ mg/sq.ft.) | Water Resistance | Wet Wipe Durability | Dry Scratch Durability | Fingerprint Resistance | Thermal Blocking |
|---|---|---|---|---|---|---|---|
| 3.1 | Experimental photographic paper B without latex overcoat | None | No | Very poor | 4 | C | 10 |
| 3.2 | Experimental photographic paper B with inventive overcoat | P9 @ 200 Wax-1 @ 10 Wax-3 @ 10 | Yes | A | 5 | A | 10 |
| 3.3 | Experimental photographic paper C without latex overcoat | None | No | Very poor | 4 | C | 10 |
| 3.4 | Experimental photographic paper C with inventive overcoat | P9 @ 200 Wax-1 @ 10 Wax-3 @ 10 | Yes | A | 5 | A | 10 |

It is evident from Table 4 that the overcoats of this invention applied to either experimental paper B or experimental paper C also provide excellent water resistance, fingerprint resistance and durability without compromising the blocking resistance at high temperature.

What is claimed is:

1. An image recording element comprising:
   a support;
   at least one image recording layer superposed on the support; and
   an overcoat layer overlying at least one image recording layer, said overcoat layer consisting essentially of a single component water insoluble polymer having a Tg equal to or less than 30° C. and comprising 75 to 100 weight percent of the monomer having the following formula (1):

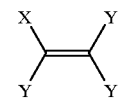

wherein: X is selected from the group consisting of Cl, F or CN, and Y is each independently selected from the group consisting of H, Cl, F, CN, $CF_3$, $CH_3$, $C_2H_5$, n—$C_3H_7$, iso—$C_3H_7$, n—$C_4H_9$, n—$C_5H_{11}$, n—$C_6H_{13}$, $OCH_3$, $OC_2H_5$, phenyl, $C_6F_5$, $C_6Cl_5$, $CH_2Cl$, $CH_2F$, $C_2F_5$, n—$C_3F_7$, iso—$C_3F_7$, $OCF_3$, $OC_2F_5$, $OC_3F_7$, $C(CF_3)_3$, $CH_2(CF_3)$, $CH(CF_3)_2$, $COCF_3$, $COC_2F_5$, $COCH_3$, $COC_2H_5$.

2. The image recording element of claim 1 wherein the element is an imaged silver-based photographic element having at least one light sensitive silver-based emulsion layer.

3. The image recording element of claim 4 wherein the element is an imaged ink-jet receiving element having at least one ink-receptive layer.

4. The image recording element of claim 1 wherein the support is transparent.

5. The image recording element of claim 1 wherein the support is reflective.

6. The image recording element of claim 1 further comprising an antistatic layer superposed on the support.

7. The image recording element of claim 1 further comprising a transparent magnetic layer superposed on the support.

8. The image recording element of claim 3 wherein the support is partially transparent and partially reflective.

9. An image recording element having a protective overcoat thereon, the protective overcoat formed by the steps comprising;

providing an image recording element; and
   applying an aqueous coating comprising a colloidal dispersion consisting essentially of a water insoluble polymer having a Tg equal to or less than 30° C. and comprising 75 to 100 weight percent of the monomer having the following formula (1):

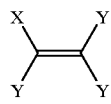 (1)

wherein: X is selected from the group consisting of —Cl, —F, or —CN, and Y is each independently selected from the group consisting of H, Cl, F, CN, $CF_3$, $CH_3$, $C_2H_5$, n—$C_3H_7$, iso—$C_3H_7$, n—$C_4H_9$, n—$C_5H_{11}$, n—$C_6H_{13}$, $OCH_3$, $OC_2H_5$, phenyl, $C_6F_5$, $C_6Cl_5$, $CH_2Cl$, $CH_2F$, Cl, F, CN, $CF_3$, $C_2F_5$, n—$C_3F_7$, iso—$C_3F_7$, $OCF_3$, $OC_2F_5$, $OC_3F_7$, $C(CF_3)_3$, $CH_2(CF_3)$, $CH(CF_3)_2$, $COCF_3$, $COC_2F_5$, $COCH_3$, $COC_2H_5$; and drying the aqueous coating to provide an image recording element having a protective overcoat.

10. The image recording element of claim 9 wherein the element is an imaged silver-based photographic element having at least one light sensitive silver-based emulsion layer.

11. The image recording element of claim 9 wherein the element is an imaged ink-jet receiving element having at least one ink-receptive layer.

12. The image recording element of claim 9 wherein the support is transparent.

13. The image recording element of claim 9 wherein the support is reflective.

14. The image recording element of claim 9 further comprising an antistatic layer superposed on the support.

15. The image recording element of claim 9 further comprising a transparent magnetic layer superposed on the support.

16. The image recording element of claim 11 wherein the support is partially transparent and partially reflective.

17. The image recording element of claim 9 wherein the aqueous coating has a solids concentration of from 1 to 50 percent.

18. The recording element of claim 1 wherein the polymer comprises 80–95 weight percent of the monomer represented in formula (1).

* * * * *

UNITED STATES PATENT AND TRADEMARK OFFICE
CERTIFICATE OF CORRECTION

PATENT NO. : 6,221,546 B1  Page 1 of 1
APPLICATION NO. : 09/354209
DATED : April 24, 2001
INVENTOR(S) : Hwei-Ling Yau et al.

It is certified that error appears in the above-identified patent and that said Letters Patent is hereby corrected as shown below:

Column 28, Line 18    should read -- claim 1 --
Column 29, Line 10    should read -- group consisting of H,C1,F,CN,CR3,CH6, n-C9H7, --

Signed and Sealed this

Nineteenth Day of September, 2006

JON W. DUDAS
*Director of the United States Patent and Trademark Office*